US011440376B2

(12) United States Patent
Calderone (10) Patent No.: US 11,440,376 B2
(45) Date of Patent: Sep. 13, 2022

(54) TECHNOLOGIES FOR MANIFOLDS (71) Applicant: Tesla, Inc., Austin, TX (US)

(72) Inventor: John David Calderone, San Jose, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 15/668,963

(22) Filed: Aug. 4, 2017

(65) Prior Publication Data

US 2019/0039440 A1 Feb. 7, 2019

(51) Int. Cl.
*B60H 1/32* (2006.01)
*B60K 7/00* (2006.01)
*B60H 1/00* (2006.01)
*B60K 1/00* (2006.01)

(52) U.S. Cl.
CPC ......... *B60H 1/3229* (2013.01); *B60H 1/3223* (2013.01); *B60K 7/0007* (2013.01); *B60H 1/00571* (2013.01); *B60K 2001/001* (2013.01); *B60K 2007/0092* (2013.01)

(58) Field of Classification Search
CPC .. B60H 1/3229; B60H 1/3223; B60K 7/0007; B60K 11/02; H02K 9/16; H02K 9/18; F28F 9/02; F28F 9/0221
USPC ......................................................... 165/41
See application file for complete search history.

(56) References Cited

U.S. PATENT DOCUMENTS

| | | | | |
|---|---|---|---|---|
| 3,141,309 A * | 7/1964 | Gesell | ...................... | F24F 5/00 62/401 |
| 3,712,759 A * | 1/1973 | Olson, Jr. | ........... | F04B 27/1081 417/269 |
| 3,728,746 A | 4/1973 | Konen et al. | | |
| 4,313,314 A * | 2/1982 | Boyanich | .............. | F25B 43/006 62/324.1 |
| 4,671,856 A * | 6/1987 | Sears | ..................... | B01D 1/221 159/24.2 |
| 4,899,799 A * | 2/1990 | Drazy | ..................... | B22C 9/046 164/137 |
| 4,957,419 A * | 9/1990 | Rascov | ................. | F04B 19/022 417/273 |
| 4,978,429 A * | 12/1990 | Sears | ..................... | B01D 1/221 159/17.1 |
| 6,052,285 A * | 4/2000 | Hileman | ............ | H05K 7/20354 165/104.14 |
| 2004/0110429 A1 * | 6/2004 | Wizgall | ................. | B63H 21/14 440/1 |
| 2008/0210405 A1 | 9/2008 | Datta et al. | | |
| 2010/0071639 A1 * | 3/2010 | Wegner | ............... | F02B 29/0412 123/41.08 |
| 2012/0153718 A1 * | 6/2012 | Rawlinson | ............... | H02K 5/20 307/10.1 |
| 2016/0039277 A1 * | 2/2016 | Falls | ........................ | B60K 1/02 180/62 |

* cited by examiner

Primary Examiner — Tho V Duong (74) Attorney, Agent, or Firm — Knobbe, Martens, Olson & Bear, LLP (57) ABSTRACT

A vehicle comprising a compressor and a manifold physically and fluidly coupled to the compressor.

30 Claims, 9 Drawing Sheets

TECHNOLOGIES FOR MANIFOLDS

TECHNICAL FIELD

Generally, this disclosure relates to vehicles. More particularly, this disclosure relates to manifolds.

BACKGROUND

Vehicle manufacturing is complex and expensive for various reasons, such as manual labor, use of a large number of components, and others. Further, some vehicle designs mandate that some components be efficiently packaged in limited spaces, without negatively affecting vehicle reliability and serviceability. However, this mandate is difficult to fulfill without certain design tradeoffs. Accordingly, there is a desire to provide a technology that reduces complexity and cost of vehicle manufacturing, without negatively affecting vehicle reliability and serviceability.

SUMMARY

This disclosure discloses various technologies that reduce complexity and cost of vehicle manufacturing, without negatively affecting vehicle reliability and serviceability. This is accomplished through inclusion of manifolds in vehicles, such as during vehicle manufacturing, where the manifolds facilitate various fluid conduction processes for various vehicular purposes, such as internal environmental comfort and heating or cooling of a powertrain.

In an embodiment, a device comprises: a manifold that is plate-shaped. The device may further comprise: a compressor coupled to the manifold; and a fluid source coupled to the manifold, where the manifold extends between the compressor and the fluid source, and where the fluid source includes at least one of a condenser, a chiller, a receiver-drier, or a coolant container. The device may have the manifold include a major surface hosting at least one of a motor or a sensor. The device may have the manifold being T-shaped in cross section. The device may have the manifold include a plurality of plates that are stacked. The device may further comprise: a plurality of compressors, where the manifold includes a major surface facing the compressors. The device may further comprise: a heat exchanger coupled to the manifold such that the heat exchanger faces the major surface. The device may further comprise: a valve coupled to the manifold such that the valve faces the major surface. The device may further comprise a VDA connector coupled to the manifold such that the manifold extends between the VDA connector and the compressors.

In an embodiment, an HVAC assembly comprises: a manifold that is plate-shaped; and a fluid source that is physically and fluidly coupled to the manifold. The HVAC assembly may have the fluid source include at least one of a compressor, a condenser, a chiller, a receiver-drier, or a coolant container. The HVAC assembly may have the manifold include a major surface hosting at least one of a motor or a sensor. The HVAC assembly may have the manifold be T-shaped in cross section. The HVAC assembly may have the manifold include a plurality of plates that are stacked. The HVAC assembly may have the fluid source include a plurality of compressors, where the manifold includes a major surface facing the compressors. The HVAC assembly may have the fluid source include a heat exchanger coupled to the manifold such that the heat exchanger faces the major surface. The HVAC assembly may further comprise: a valve coupled to the manifold such that the valve faces the major surface. The HVAC assembly may further comprise: a VDA connector coupled to the manifold such that the manifold extends between the VDA connector and the compressors.

In an embodiment, a vehicle comprises: an HVAC assembly including a fluid source; and a manifold that is plate-shaped and physically and fluidly coupled to the manifold. The vehicle may have the fluid source include at least one of a compressor, a condenser, a chiller, a receiver-drier, or a coolant container. The vehicle may have the manifold include a major surface hosting at least one of a motor or a sensor. The vehicle may have the manifold be T-shaped in cross section. The vehicle may have the manifold include a plurality of plates that are stacked. The vehicle may have the fluid source include a plurality of compressors, where the manifold includes a major surface facing the compressors. The vehicle may have the fluid source include a heat exchanger coupled to the manifold such that the heat exchanger faces the major surface. The vehicle may further comprise: a valve coupled to the manifold such that the valve faces the major surface. The vehicle may further comprise: a VDA connector coupled to the manifold such that the manifold extends between the VDA connector and the compressors. The vehicle may further comprise: an electric motor powering a vehicle wheel.

These and other embodiments of this disclosure are discussed in greater detail below with reference to various accompanying drawings.

DETAILED DESCRIPTION

Generally, this disclosure discloses various technologies for reducing complexity and cost of vehicle manufacturing, without negatively affecting vehicle reliability and serviceability. This is accomplished through inclusion of manifolds in vehicles, whether completely or partially, in place of individual hoses or pipes, in order to transfer fluids between separate vehicular components. Instead, for example, the separate vehicular components are hard mounted to a manifold for a vehicular assembly, such as during vehicle manufacturing, where the manifold can facilitate various fluid conduction processes for various vehicular purposes, such as internal environmental comfort, heating or cooling of a powertrain, or others.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Figure 1:
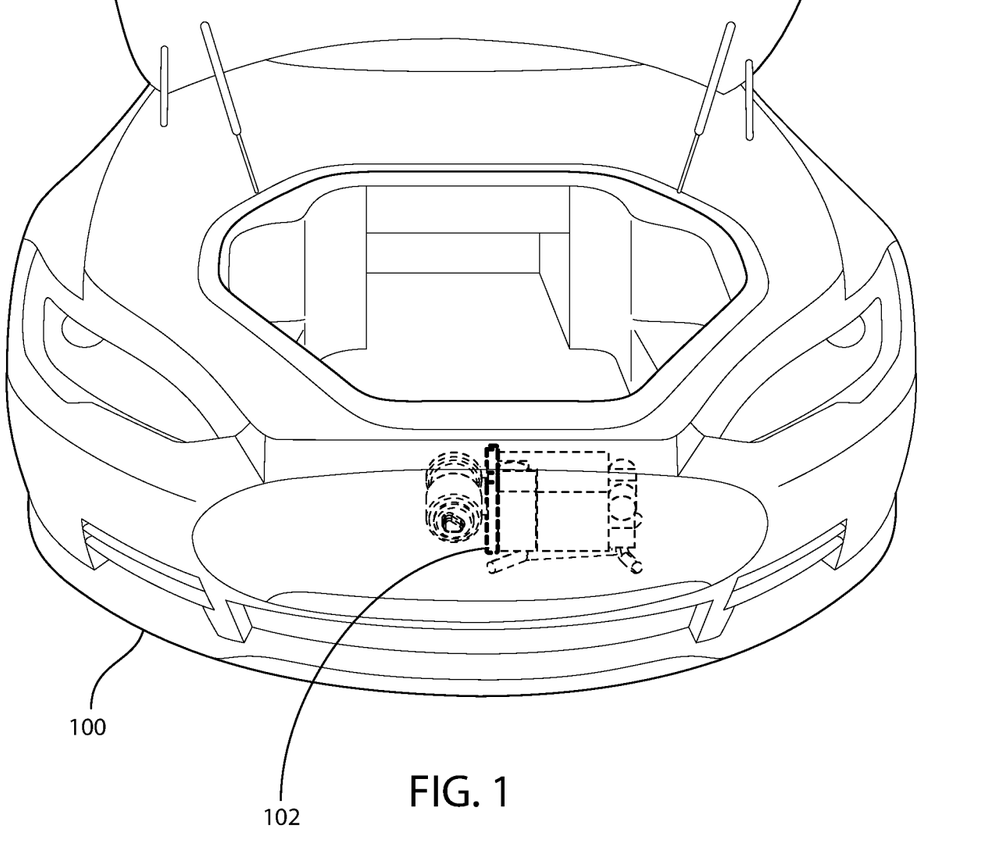
FIG. 1 illustrates a vehicle hosting an HVAC assembly with a manifold in accordance with principles disclosed herein.

FIG. 1 illustrates of an embodiment of a vehicle hosting a manifold according to this disclosure. In particular, a vehicle 100 includes a chassis that supports a manifold 102 in a vehicular heating ventilation air conditioning (HVAC) system, such as a liquid-cooled refrigeration system with an integrated coolant system, as disclosed herein. For example, the vehicle 100 can host an integrated thermal system supported via the manifold 102, whether directly or indirectly. For example, the manifold 102 can be physically coupled, such as via fastening, adhering, mating, interlocking, brazing, molding, or others, to the chassis such that the manifold 102 is supported via the chassis, whether from below the manifold 102, lateral to the manifold 102, or from above the manifold 102.

The vehicle 100 can be a land vehicle, whether manned or unmanned, whether non-autonomous, semi-autonomous, or fully autonomous, such as a car/automobile, a sports utility vehicle (SUV), a van, a minivan, a limousine, a bus, a truck, a trailer, a tank, a tractor, a motorcycle, a heavy equipment vehicle, or others. For example, the vehicle 100 can be a Tesla Corporation Model S (or any other Tesla Corporation model) equipped with Tesla Autopilot (enhanced Autopilot) driver assist functionality and having a Hardware 2 component set (November 2016).

The chassis supports a power source, a drive source, a set of wheels, a computing unit, and other vehicle components. The power source includes a battery, which is rechargeable. The drive source includes an electric motor, whether brushed or brushless. However, an internal combustion engine is possible, in which case the power source includes a fuel tank hosted via the chassis and coupled to the internal combustion engine. The power source is coupled to the drive source such that the drive source is powered thereby. The set of wheels includes at least one wheel, which may include an inflatable tire, which may include a run-flat tire. The set of wheels is driven via the drive source.

The manifold 102 communicates fluids, whether a liquid or a gas, such as refrigerant or a coolant, between two or more components of the vehicle 100. Such communication takes place via a plurality of passages formed inside the manifold 102, where the fluids can be conducted under a high pressure or a low pressure. The passages span between various ports of the manifold 102, where the ports uniquely couple to various fluid sources, such as in a one-to-one manner or others. The manifold 102 can be physically or fluidly coupled to or integrated with a component, including a plurality of components, in any arrangement, whether directly or indirectly, based on an available space and is mostly independent of function. For example, some of such components can include a compressor, a heat exchanger, an electronic expansion valve (EXV) core, a receiver-drier, a refrigerant charge port, a pressure sensor, a temperature sensor, a refrigerant muffler, an internal heat exchanger, or others, as disclosed herein. For example, a set of brazed plate heat exchangers, such as a chiller or a liquid-cooled condenser, can be brazed directly to the manifold 102. For example, the manifold 102 can be physically coupled to a component in various ways, such as brazing, fastening, mating, interlocking, molding, adhering, or others.

The manifold 102 may be made of a same or single material, such as plastic, metal, rubber, or others, or a combination of materials, such as a plastic and a metal or others. The manifold 102 may be formed into a unitary member, such as fused plastic sections, or may be an assembly of pieces, such as a plurality of plates that are stacked and may be physically coupled to each other, including contacting each other, such as via brazing, adhering, fastening, mating, interlocking, mounting, molding, securing, or other ways. For example, the manifold 102 may be constructed via a plurality of flat or planar or formed stamped plates brazed together or a plurality of forged or die cast portions brazed or laser welded together.

The manifold 102 may be physically solid, perforated, opaque, transparent, translucent, or others. The manifold 102 can include any type of material, such as plastic, metal, rubber, wood, or others. The manifold 102 can be of any suitable shape, whether symmetric or asymmetric, whether open or closed. The manifold 102 can define a hole of any shape anywhere therethrough. The manifold 102 can include a projection or a depression of any shape anywhere thereon. Preferably, overall, the manifold 102 is plate-shaped having a thickness dimension between two major surfaces that is less, preferably significantly less, than each of a height dimension and a width dimension of the major surfaces. For example, at least one of the major surfaces can include a portion that can be flat, sinusoidal, arcuate, or others, and that can be polygonally-shaped, whether symmetrically or asymmetrically, such as a rectangle, a square, or others. Preferably, at least a portion of the manifold 102 is plate-shaped. However, note that such structure is not limiting and the manifold 102 can vary, such as being cylindrically-shaped, stair-stepped, or others.

The manifold 102 can be thermally or electrically resistant or conductive or semi-conductive. Although the vehicle 100 contains the manifold 102 in a front portion of the vehicle 100, other configurations are possible, such as where the manifold 102 is positioned in a middle portion of the vehicle 100 or a rear portion of the vehicle 100.

FIGS. 2-5 are various views of an assembly 200, in this case an HVAC assembly, including a plate-shaped manifold 202 embodying principles disclosed herein. The manifold 202 is similar to or the same as the manifold 102, and can include the above-described features and characteristics.

Figure 2:
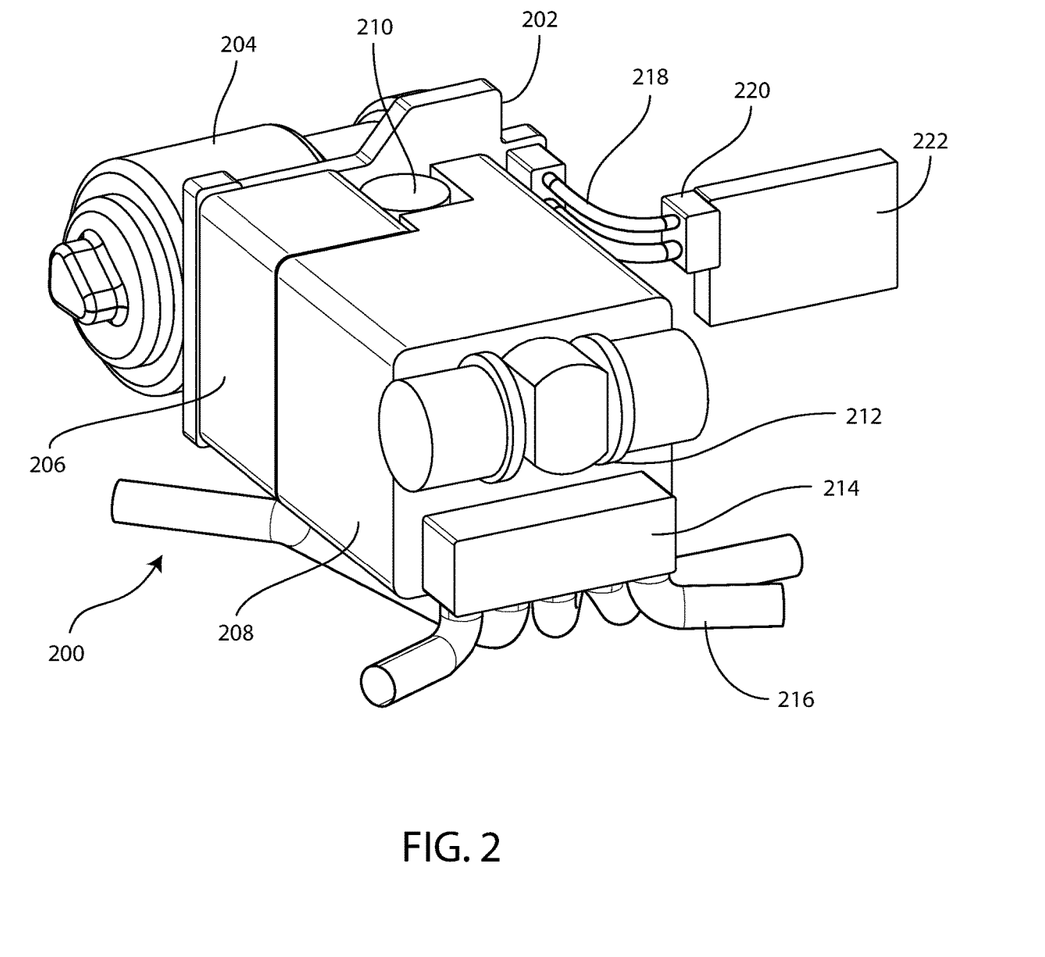
FIG. 2 illustrates an HVAC assembly including a first plate-shaped manifold which interconnects components on two sides thereof in accordance with principles disclosed herein.
Figure 3:
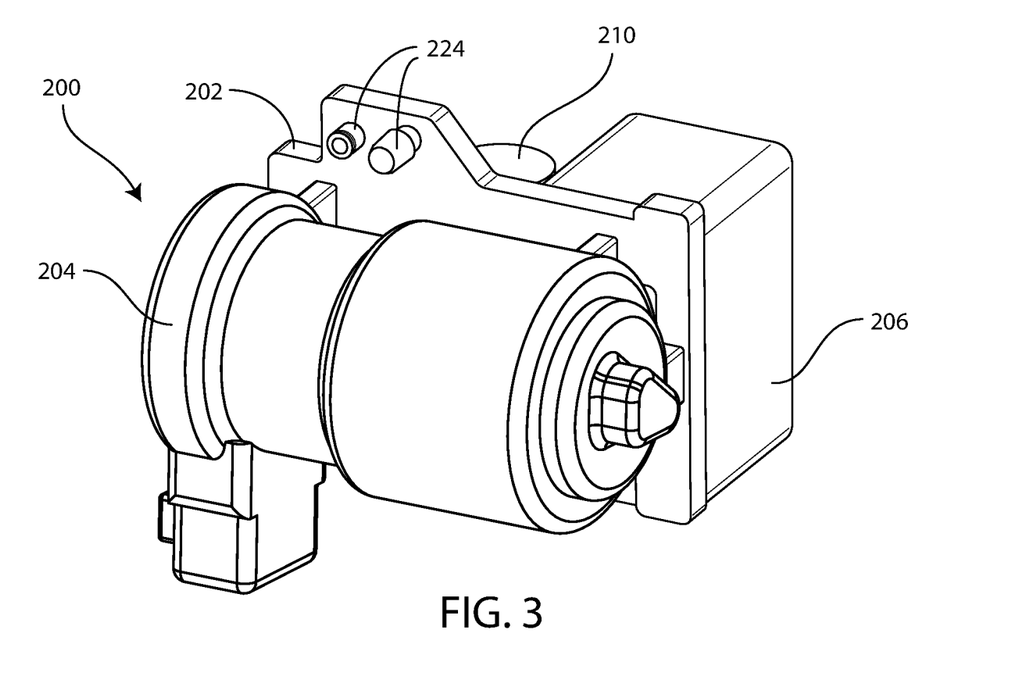
FIG. 3 illustrates a portion of the HVAC assembly of FIG. 2 from a first viewpoint.
Figure 4:
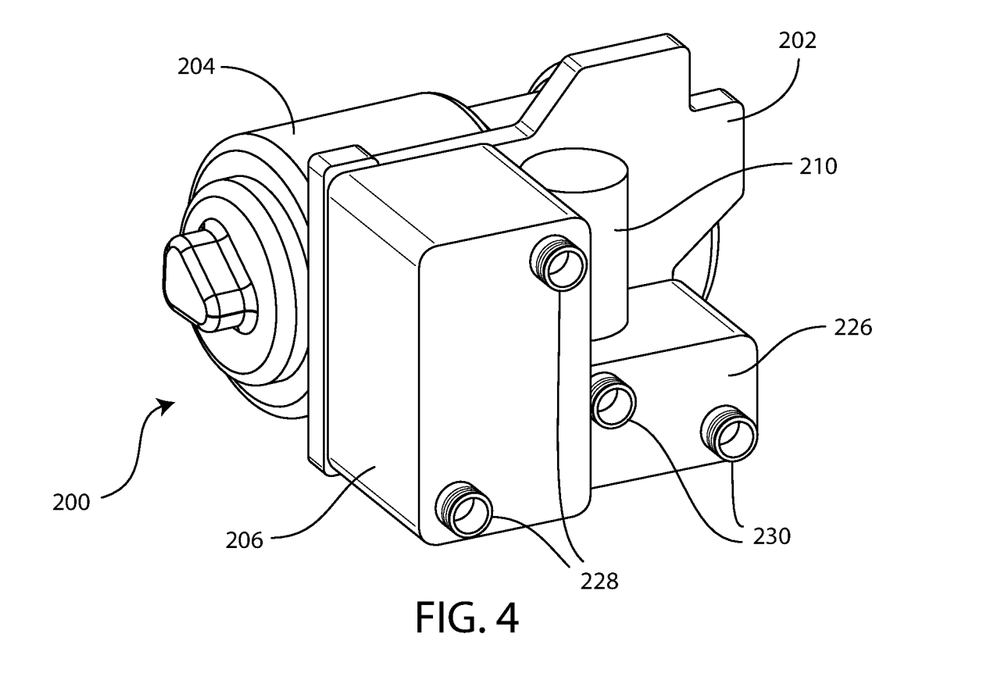
FIG. 4 illustrates the portion of FIG. 3 of the HVAC assembly of FIG. 2 from a second viewpoint.
Figure 5:
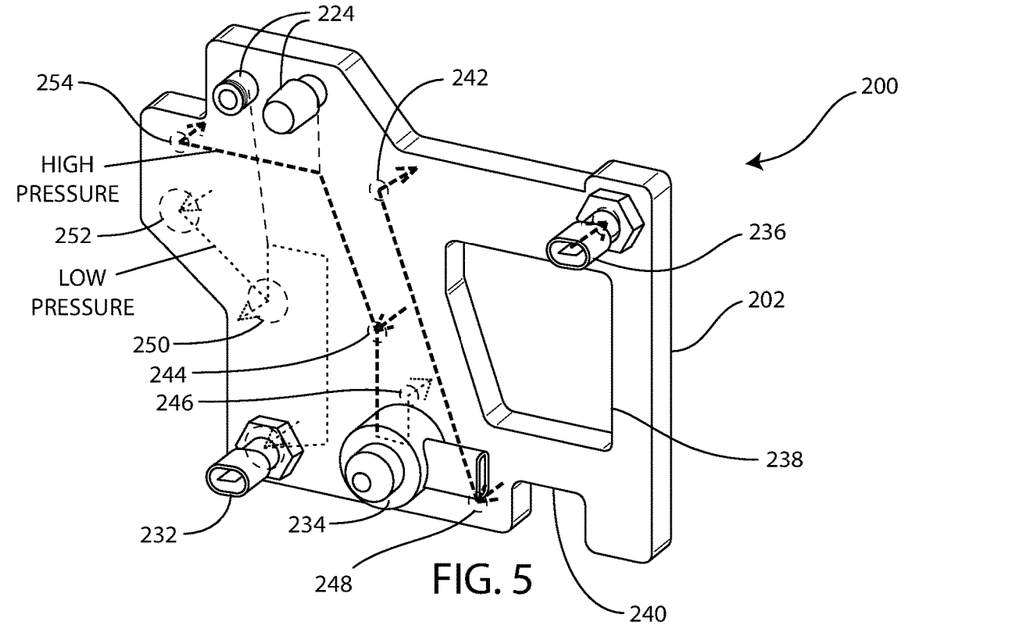
FIG. 5 illustrates the first manifold of FIGS. 2-4 with a fluid routing scheme.

FIG. 2 illustrates an entire assembly 200 with the manifold 202. FIG. 3 illustrates a portion of the assembly 200 in which a compressor 204 is coupled to one side of a the manifold 202 and a condenser 206 is coupled to an opposite side of the manifold 202, as viewed from the compressor side of the manifold. FIG. 4 illustrates the same portion of the assembly 200, but as viewed from the condenser side of the manifold. FIG. 5 illustrates the manifold 202 and a diagram of a fluid routing scheme of the manifold 202 according to this disclosure.

Figure 7:
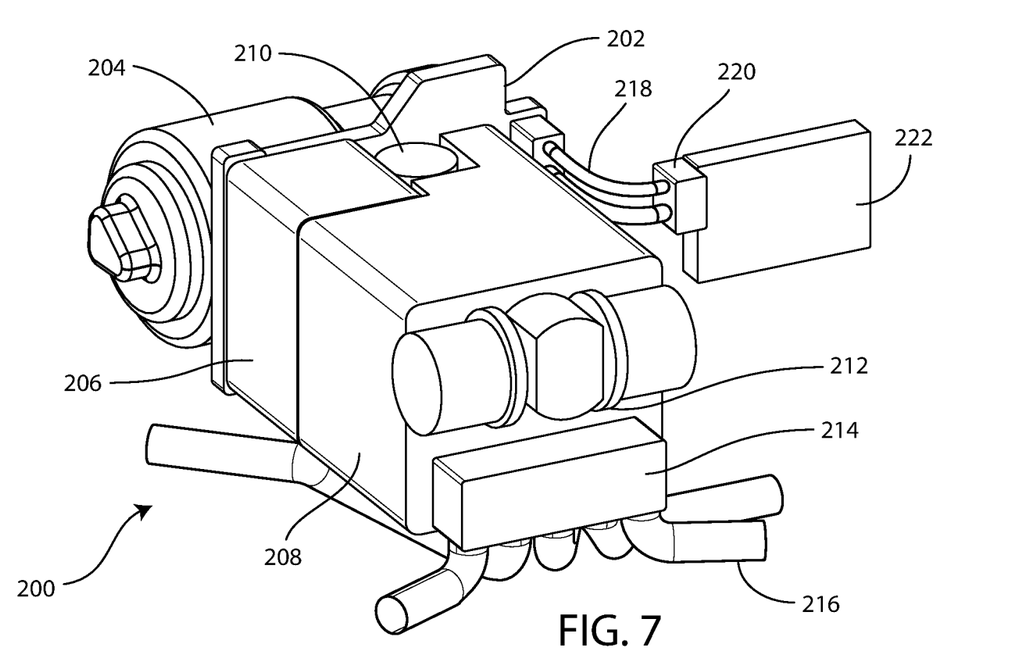
FIG. 7 illustrates the HVAC assembly of FIG. 2 from a first viewpoint.
Figure 8:
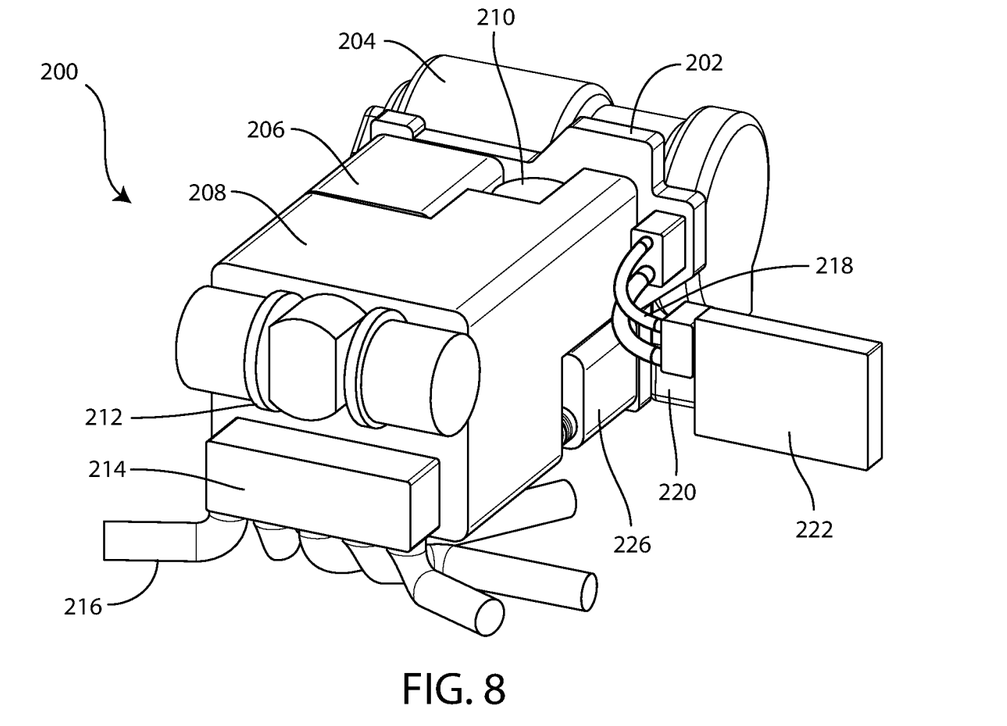
FIG. 8 illustrates the HVAC assembly of FIG. 2 from a second viewpoint.

FIGS. 7 and 8 illustrate the assembly 200 from two different viewpoints for ease of understanding how various components can be assembly and hosted on the manifold 202. For example, FIG. 8 illustrates how an evaporator and a TXV valve can also be hosted on the manifold.

In particular, the assembly 200 includes the manifold 202, a compressor 204, a liquid-cooled condenser 206, a coolant container 208, a receiver-drier 210, a plurality of fluid handlers 212, a hose connector block 214, a plurality of hoses 216, a plurality of hoses 218, a thermal expansion valve (TXV) 220, an evaporator 222, a plurality of ports 224, a chiller 226, a plurality of ports 228, a plurality of ports 230, a sensor 232, an EXV motor 234, a port 236, an opening 238, a slot 240, a plurality of high pressure fluid routes, and a plurality of low pressure fluid routes.

The manifold 202 includes a first side and a second side on opposite sides of the manifold. For example, the first side can include a first major surface and the second side can include a second major surface. The first side faces or is exposed to the compressor 204, the ports 224, the sensor 232, the EXV motor 234, and the port 236. The second side faces or is exposed to the liquid-cooled condenser 206, the coolant container 208, the receiver-drier 210, the fluid handlers 212, the hose connector block 214, the hoses 216, the hoses 218, the TXV 220, the evaporator 222, the chiller 226, the ports 228, and the ports 230.

As illustrated best in FIG. 5, in a region of the manifold 202 that does not include fluid channels, a portion of the manifold 202 removed or not included so as to define an opening 238 therethrough, with the opening 238 extending between the first side and the second side. This enables the manifold to use less material, while still providing a coupling structure, thereby providing an advantage of a lower weight and use of less material. The compressor 204 may face the opening 238, which may include covering the opening 238. The manifold 202 defines the slot 240, which may be used for chassis mounting, such as via mating, interlocking, adhering, brazing, or other ways.

The ports 224 extend from the manifold 202. For example, the ports 224 can be unitary to the manifold 202 or assembled therewith. For example, the ports 224 can be physically coupled to the manifold 202 via brazing, adhering, fastening, mating, interlocking, mounting, molding, securing, or other ways such that the ports 224 can fluidly communicate therewith. The ports 224 are refrigerant charge ports, which may be structured for refrigerant fluid conduction, whether a liquid or a gas. For example, the ports 224 may be threaded and capped when not in use. Note that the ports 224 can be of any shape, size, or type suitable for physical and fluid coupling to the manifold 202.

The sensor 232 senses at least one of a fluid temperature or a fluid pressure or a fluid level or a fluid presence, whether a liquid or a gas. The sensor 232 may be static or active. The sensor 232 may be powered via the power source of the vehicle 100. The sensor 232 may output a signal informative of a value corresponding to a measured fluid property, such as a temperature or a pressure. The sensor 232 extends from the manifold 202. For example, the sensor 232 can be physically coupled to the manifold 202 via brazing, adhering, fastening, mating, interlocking, mounting, molding, securing, or other ways such that the sensor 232 can sense a fluid property. Note that the sensor 232 can be of any shape, size, or type suitable for physical and fluid coupling to the manifold 202.

The EXV motor 234 extends from the manifold 202. For example, the EXV motor 234 can be physically coupled to the manifold 202 via brazing, adhering, fastening, mating, interlocking, mounting, molding, securing, or other ways such that the EXV motor 234 can be driven. The EXV motor 234 is structured to expand or to contract a fluid, whether a liquid or a gas, such as a refrigerant. The EXV motor 234 may be powered via the power source of the vehicle 100. Note that the EXV motor 234 can be of any shape, size, or type suitable for physical and fluid coupling to the manifold 202.

The port 236 is structured to physically and fluidly couple to the compressor 204, whether directly or indirectly. For example, the port 236 can be physically coupled to the manifold 202 via brazing, adhering, fastening, mating, interlocking, mounting, molding, securing, or other ways such that the compressor 204 can fluidly communicate therewith. Note that the port 236 can be of any shape, size, or type suitable for physical and fluid coupling to the manifold 202.

The compressor 204 is physically and fluidly coupled to the manifold 202, whether directly or indirectly. For example, the compressor 204 can be physically coupled to the manifold 202 via brazing, adhering, fastening, mating, interlocking, mounting, molding, securing, or other ways such that the compressor 204 can fluidly communicate through the manifold 202, whether inbound or outbound. Note that the compressor 204 can be of any shape, size, or type suitable for physical and fluid coupling to the manifold 202. Although the compressor 204 is cylindrically-shaped, the compressor 204 can be shaped differently, such as cuboid or others.

The liquid-cooled condenser 206 is physically and fluidly coupled to the manifold 202, whether directly or indirectly, such that the manifold 202 extends between the compressor 204 and the condenser 206. For example, the liquid-cooled condenser 206 can be physically coupled to the manifold 202 via brazing, adhering, fastening, mating, interlocking, mounting, molding, securing, or other ways such that the liquid-cooled condenser 206 can fluidly communicate through the manifold 202, whether inbound or outbound. Note that the liquid-cooled condenser 206 can be of any shape, size, or type suitable for physical and fluid coupling to the manifold 202. Although the liquid-cooled condenser 206 is cuboid-shaped, the liquid-cooled condenser 206 can be shaped differently, such as tubularly or others. The liquid-cooled condenser 206 hosts the ports 228 for fluid communication, whether inbound or outbound.

The chiller 226 is physically and fluidly coupled to the manifold 202, whether directly or indirectly, such that the manifold 202 extends between the compressor 204 and the chiller 226. For example, the chiller 226 can be physically coupled to the manifold 202 via brazing, adhering, fastening, mating, interlocking, mounting, molding, securing, or other ways such that the chiller 226 can fluidly communicate through the manifold 202, whether inbound or outbound. Note that the chiller 226 can be of any shape, size, or type suitable for physical and fluid coupling to the manifold 202. Although the chiller 226 is cuboid, the chiller 226 can be shaped differently, such as tubular or others. The chiller 226 hosts the ports 230 for fluid communication, whether inbound or outbound.

The receiver-drier 210 is physically and fluidly coupled to the manifold internal to the manifold 202, whether directly or indirectly, such that the manifold 202 extends between the compressor 204 and the receiver-drier 210. For example, the receiver-drier 210 can be physically coupled to the manifold 202 via brazing, adhering, fastening, mating, interlocking, mounting, molding, securing, or other ways such that the receiver-drier 210 can fluidly communicate through the manifold 202, whether inbound or outbound. Note that the receiver-drier 210 can be of any shape, size, or type suitable for physical and fluid coupling to the manifold 202. Although the receiver-drier 210 is tubular, the receiver-drier 210 can be shaped differently, such as cuboid. Note that the receiver-driver 210 may function as a reservoir a fluid, whether a liquid or a gas, such as a refrigerant, as received from the liquid-cooled condenser 206. In some embodiments, the liquid-cooled condenser 206 and the receiver-drier 210 are a single unit. In some embodiments, the chiller 226 and the receiver-drier 210 are a single unit.

The coolant container 208 is physically and fluidly coupled to the manifold 202, whether directly or indirectly, such that the manifold 202 extends between the compressor 204 and the coolant container 208. For example, the coolant container 208 can be physically coupled to the manifold 202 via brazing, adhering, fastening, mating, interlocking, mounting, molding, securing, or other ways such that the coolant container 208 can fluidly communicate through the manifold 202, whether inbound or outbound. Note that the coolant container 208 can be of any shape, size, or type suitable for physical and fluid coupling to the manifold 202. Although the coolant container 208 is step-shaped, the coolant container 208 can be shaped differently, such as cuboid or others. The coolant container 208 is in physical and fluid communication, whether inbound or outbound, whether direct or indirect, with the liquid-cooled condenser 206 via the ports 228. The coolant container 208 is in physical and fluid communication, whether inbound or outbound, whether direct or indirect, with the chiller 226 via the ports 230.

The fluid handlers 212 are physically and fluidly coupled to the coolant container 208 in a T-shape manner therewith, whether directly or indirectly. For example, at least one of the fluid handlers 212 can be physically coupled to the coolant container 208 via brazing, adhering, fastening, mating, interlocking, mounting, molding, securing, or other ways such that the at least one of the fluid handlers 212 can fluidly communicate therewith, whether inbound or outbound. Each of the fluid handlers 212 includes a fluid pump and a multi-way valve for fluid pumping into the coolant container 208. For example, the fluid pump may be powered via the power source of the vehicle 100. For example, the multi-way valve can be at least two ways, such as five ways or more. Note that the fluid handlers 212 can be of any shape, size, or type suitable for physical and fluid coupling to the coolant container 208.

The hoses 216 are physically and fluidly coupled to the hose connector block 214, whether directly or indirectly. For example, at least one of the hoses 216 can be physically coupled to the hose connector block 214 via hose clamps, quick disconnects, brazing, or threading engagement, or any other suitable way such that the at least one of the hoses 216 can fluidly communicate therewith, whether inbound or outbound. The hoses 216 may conduct a fluid, whether a liquid or a gas, such as a coolant. Since the hoses 216 converge into the hose connector block 214, this reduces a number of assembly operations and an installation of the hose connector block 214 may be easier to automate for manufacturing. Note that the hoses 216 can be of any shape, size, or type suitable for physical and fluid coupling to the hose connector block 214.

The hose connector block 214 is physically and fluidly coupled to the coolant container 208, whether directly or indirectly. For example, the hose connector block 214 can be physically coupled to the coolant container 208 via brazing, adhering, fastening, mating, interlocking, mounting, molding, securing, or other ways such that the hose connector block 214 can fluidly communicate therewith, whether inbound or outbound. Note that the hose connector block 214 can be of any shape, size, or type suitable for physical and fluid coupling to the coolant container 208.

The evaporator 222 can be integrated with or be physically and fluidly coupled to the TXV 220, whether directly or indirectly. For example, the evaporator 222 can be integrated with or be physically coupled to the TXV 220 via brazing, adhering, fastening, mating, interlocking, mounting, molding, securing, or other ways such that the evaporator 222 can fluidly communicate therewith, whether directly or indirectly. The evaporator 222 may be supported via the chassis of the vehicle 100. The evaporator 222 and the TXV 220 are fluidly coupled to the manifold 202 via the hoses 218, which may be rubber. As such, the evaporator 222 and the TXV 220 can be pre-assembled on a sub-assembly line and then fluidly coupled to the manifold 202 via the hoses 218. Note that the evaporator 222 can be of any shape, size, or type suitable for integration with or physical and fluid coupling to the TXV 220. Note that the TXV 220 can be of any shape, size, or type suitable for integration with or physical and fluid coupling to the evaporator 222.

As shown in FIG. 5, the manifold 202 contains high pressure fluid routes and low pressure fluid routes, which routes are suitable shaped channels or passages with the manifold 202. In particular, the manifold 202 contains a fluid point 242, which is included in the high pressure fluid routes, that enables fluid communication from the compressor 204 to the receiver-drier 210. Moreover, the manifold 202 contains a fluid point 248, which is included in the high pressure fluid routes, that enables fluid communication from the liquid-cooled condenser 206 to the compressor 204. Also, the manifold 202 contains a fluid point 244, which is included in the high pressure fluid routes, that enables fluid communication from the receiver-drier 210 to the compressor 204. Additionally, the manifold 202 contains a fluid point 254, which is included in the high pressure fluid routes, that enables fluid communication from a refrigerant charge source to the TXV 220 and the evaporator 222. Furthermore, the port 236 is included in the high pressure fluid routes and enables fluid communication from the compressor 204 to the liquid-cooled condenser 206.

Similarly, the manifold 202 contains a fluid point 246, which is included in the low pressure fluid routes, that enables fluid communication from the compressor 204 to the chiller 226. Also, the manifold 202 contains a fluid point 250, which is included in the low pressure fluid routes, that enables fluid communication from the chiller 226 to the compressor 204. Moreover, the manifold 202 contains a fluid point 252, which is included in the low pressure fluid routes, that enables fluid communication from the TXV 220 and the evaporator 222 to the compressor 204. Furthermore, the sensor 232 is included in the low pressure fluid routes and senses the fluid property from the chiller 226. Note that although various refrigerant passages are shown as formed within the manifold 202, whether high or low pressure, such passages can extend in in the manifold in various ways. For example, exact routing is customizable for different system designs.

Figure 6:
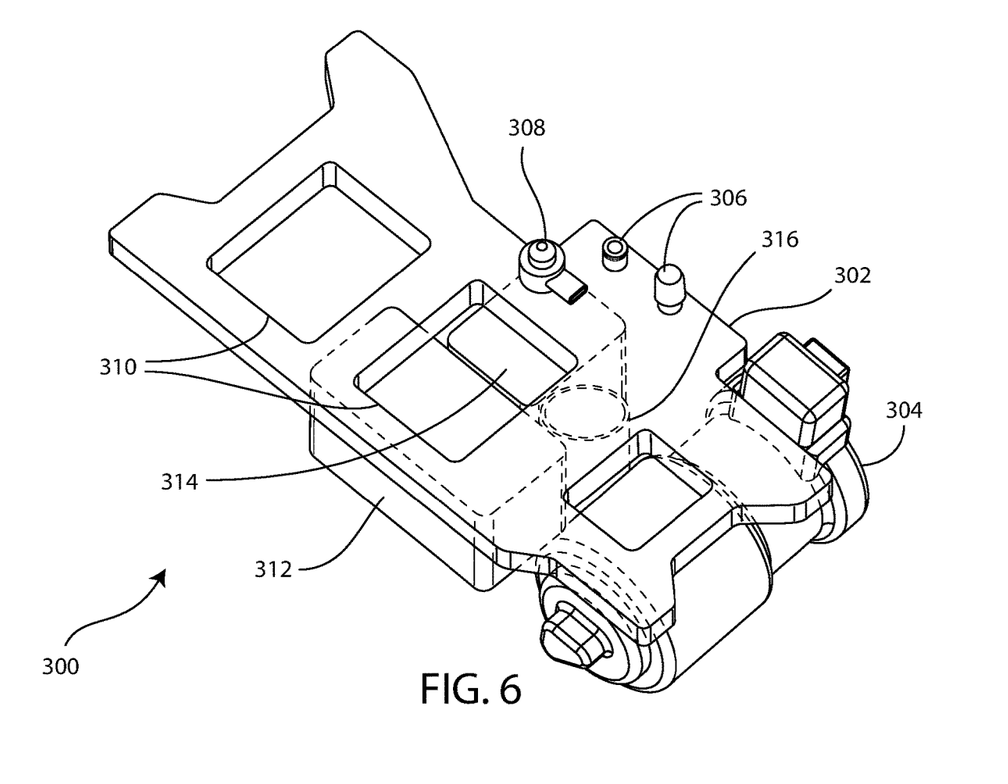
FIG. 6 illustrates a second plate-shaped manifold which interconnects components on one side thereof in accordance with principles disclosed herein.

FIG. 6 illustrates an embodiment of another plate-shaped manifold with a single side hosting a compressor, a liquid-cooled condenser, a chiller, and a receiver-drier according to this disclosure. In particular, an assembly 300 includes a manifold 302, a compressor 304, a plurality of ports 306, an EXV motor 308, a plurality of openings 310, a liquid-cooled condenser 312, a chiller 314, and a receiver-drier 316. The manifold 302, which is similar to the manifold 202, has openings 310 therein, which are similar to the opening 238, although of different number, shape, and size. The compressor 304 is similar to the compressor 204. The ports 306 are similar to the ports 22. The EXV motor 308 is similar to the EXV motor 234. The liquid-cooled condenser 312 is similar to the liquid-cooled condenser 206. The chiller 314 is similar to the chiller 226. The receiver-drier 316 is similar to the receiver-drier 210. Note that unlike FIGS. 1-5, in the assembly 300, the manifold 302 has a first side and a second side. The first side hosts the compressor 304, the liquid-cooled condenser 312, the chiller 314, and the receiver-drier 316. The second side hosts the ports 306 and the EXV motor 308.

Figure 9:
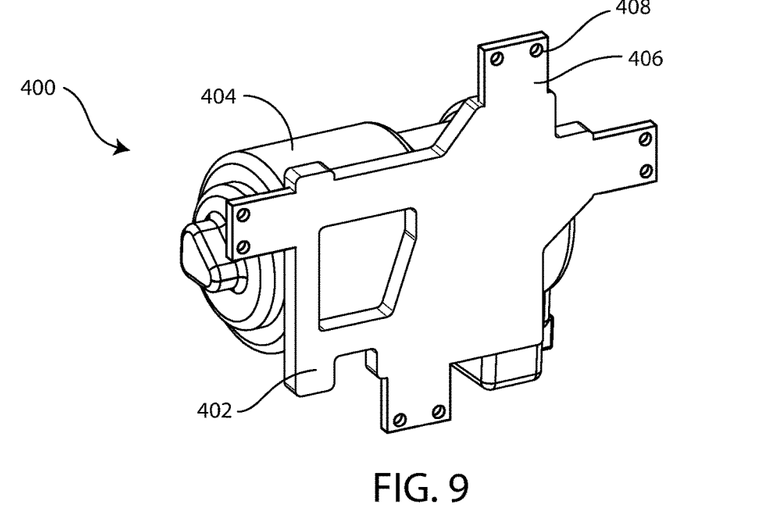
FIG. 9 illustrates a third plate-shaped manifold embodying further principles disclosed herein.

FIG. 9 illustrates an embodiment of another plate-shaped manifold with a plurality of coupling portions according to this disclosure. In particular, an assembly 400 includes a manifold 402, a compressor 404, a plurality of mounts 406, and a plurality of bores 408. The manifold 402 is similar to the manifold 202. The compressor 404 is similar to the compressor 202. The mounts 406 include a plurality of projections, whether rigid or flexible, projecting from the manifold 402 in a plurality of directions. The mounts 406 can be unitary to the manifold 402 or be assembled therewith, such as via brazing, adhering, fastening, mating, interlocking, mounting, molding, securing, or other ways. The mounts 406 can include plastic, metal, rubber, wood, or other materials. The mounts 406 can be shaped, sized, or oriented identical to or different from each other in any way. For example, at least one of the mounts 406 can include, host, be integrated with or coupled to a bracket. Note that the manifold 402 includes the mounts 406 in order to support various integrated components and for connection, with vibration isolation, to the chassis or another portion of the vehicle 100.

Each of the mounts 406 contains a plurality of bores 408, which may be identical or different from each other in shape or depth. As such, the manifold 402 can be physically coupled to the vehicle 100 via the bores 408, such as via fastening, brazing, adhering, mating, interlocking, mounting, molding, securing, or other ways. However, in some embodiments, the bores 408 may be lacking and the manifold 402 can be physically coupled to the vehicle 100 in various ways, such as via brazing, adhering, fastening, mating, interlocking, mounting, molding, securing, or other ways.

Figure 10:
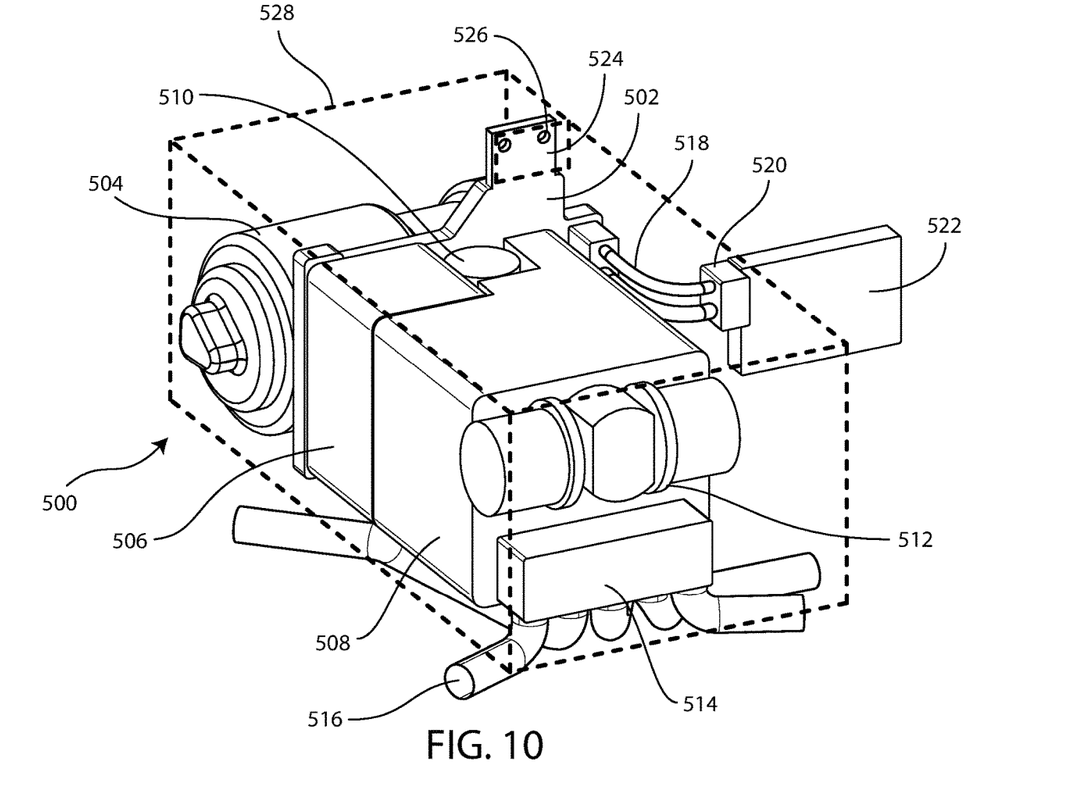
FIG. 10 illustrates an HVAC assembly similar to that of FIG. 2 covered by and coupled to a noise, vibration, and harshness (NVH) cover according to further principles disclosed herein.

FIG. 10 illustrates an embodiment of an assembly similar to assembly 200, but which is covered by and coupled to a NVH cover according to this disclosure. In particular, an assembly 500 includes a manifold 502, a compressor 504, a liquid-cooled condenser 506, a coolant container 508, a receiver-drier 510, a plurality of fluid handlers 512, a hose connector block 514, a plurality of hoses 516, a plurality of hoses 518, a TXV 520, and an evaporator 522, a mount 524, a plurality of bores 526, and an NVH cover 528. The manifold 502 is similar to the manifold 202. The compressor 504 is similar to the compressor 204. The liquid-cooled condenser 506 is similar to the liquid-cooled condenser 206. The coolant container 508 is similar to the coolant container 208. The receiver-drier 510 is similar to the receiver-drier 210. The fluid handlers 512 are similar to the fluid handlers 212. The hose connector block 514 is similar to the hose connector block 214. The hoses 516 are similar to the hoses 216. The hoses 518 are similar to the hoses 218. The TXV 520 is similar to the TXV 220. The evaporator 522 is similar to the evaporator 222. The mount 524 is similar to the mounts 408. The bores 526 are similar to the bores 408. The NHV cover 528 covers, whether in whole or in part, the manifold 502, the compressor 504, the liquid-cooled condenser 506, the coolant container 508, the receiver-drier 510, the fluid handlers 512, the hose connector block 514, the hoses 516, hoses 518, and the mount 524. The NVH cover 528 accommodates for the mount 524, such as via shape and bores corresponding to the bores 526. The NVH cover 528 can include urethane foam or any other suitable material. The NVH cover 528 can be shaped or sized in any matter suitable for the assembly 500. Note that the NVH cover 528 is able to muffle a noise from a vibration of the compressor 504.

Figure 11:
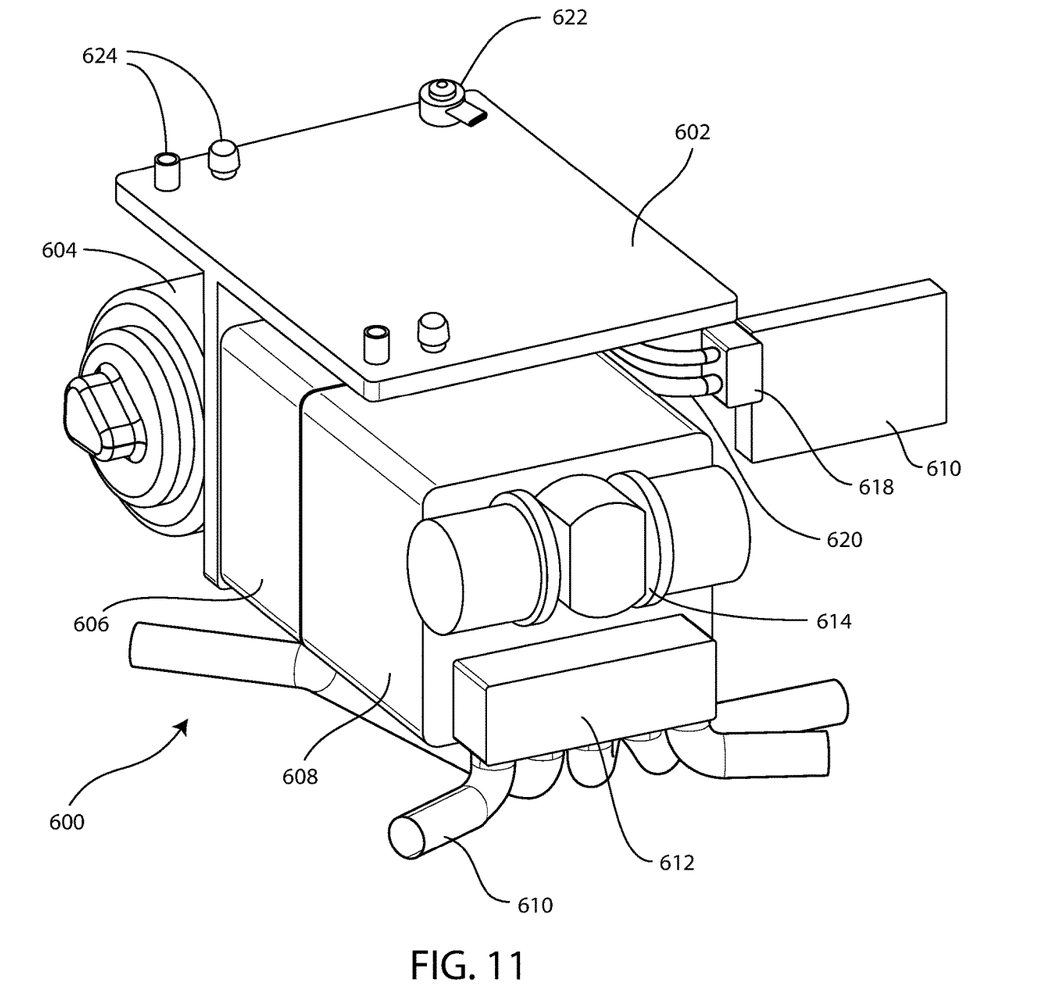
FIG. 11 illustrates a fourth manifold that is T-shaped according further principles disclosed herein.

FIG. 11 illustrates an embodiment of an assembly with a manifold that is T-shaped according to this disclosure. In particular, an assembly 600 includes a manifold 602, a compressor 604, a liquid-cooled condenser 606, a coolant container 608, a plurality of hoses 610, a hose connector block 612, a plurality of fluid handlers 614, an evaporator 616, a TXV valve 618, a plurality of hoses 620, an EXV motor 622, and a plurality of ports 624.

The manifold 602 is similar to the manifold 202. The compressor 604 is similar to the compressor 204. The liquid-cooled condenser 606 is similar to the liquid-cooled condenser 206. The coolant container 608 is similar to the coolant container 208. The fluid handlers 614 are similar to the fluid handlers 212. The hose connector block 612 is similar to the hose connector block 214. The hoses 610 are similar to the hoses 216. The hoses 620 are similar to the hoses 218. The TXV 618 is similar to the TXV 220. The evaporator 616 is similar to the evaporator 222. The EXV 622 is similar to the EXV 234. The ports 624 are similar to the ports 224.

Figure 12:
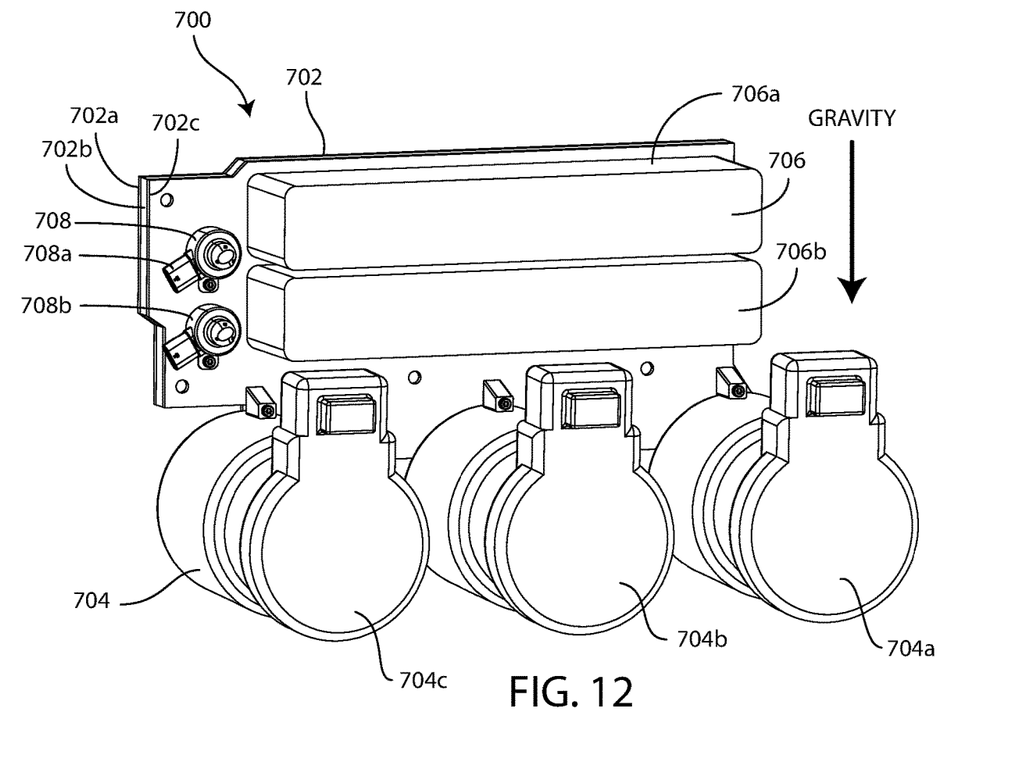
FIG. 12 illustrates a fifth plate-shaped manifold coupled to a plurality of compressors and a plurality of heat exchangers according to further principles disclosed herein as viewed from a compressor side of the manifold.
Figure 13:
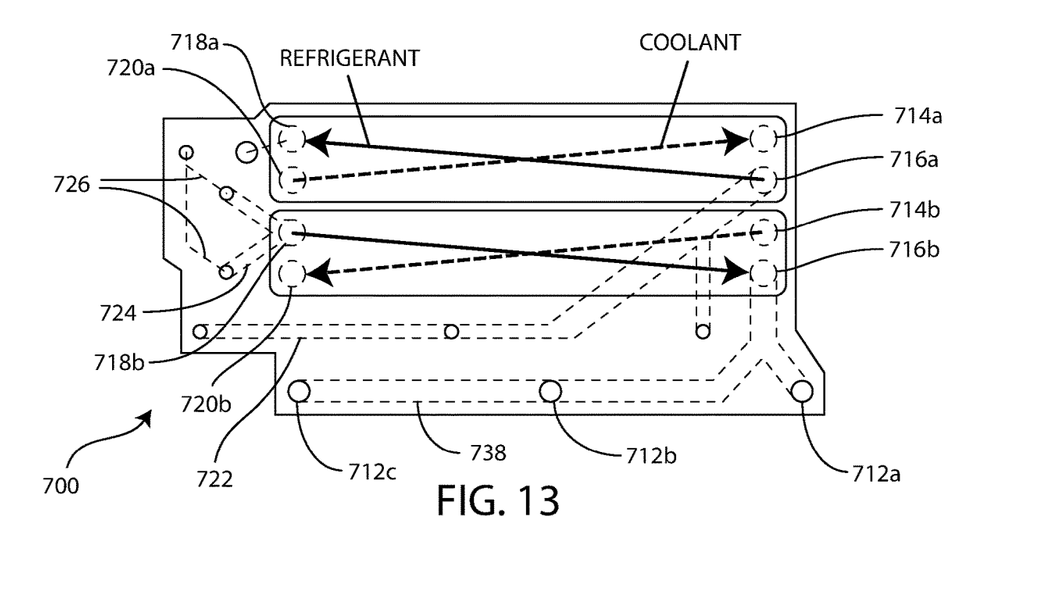
FIG. 13 illustrates the fifth manifold of FIG. 12 and a fluid routing scheme.
Figure 14:
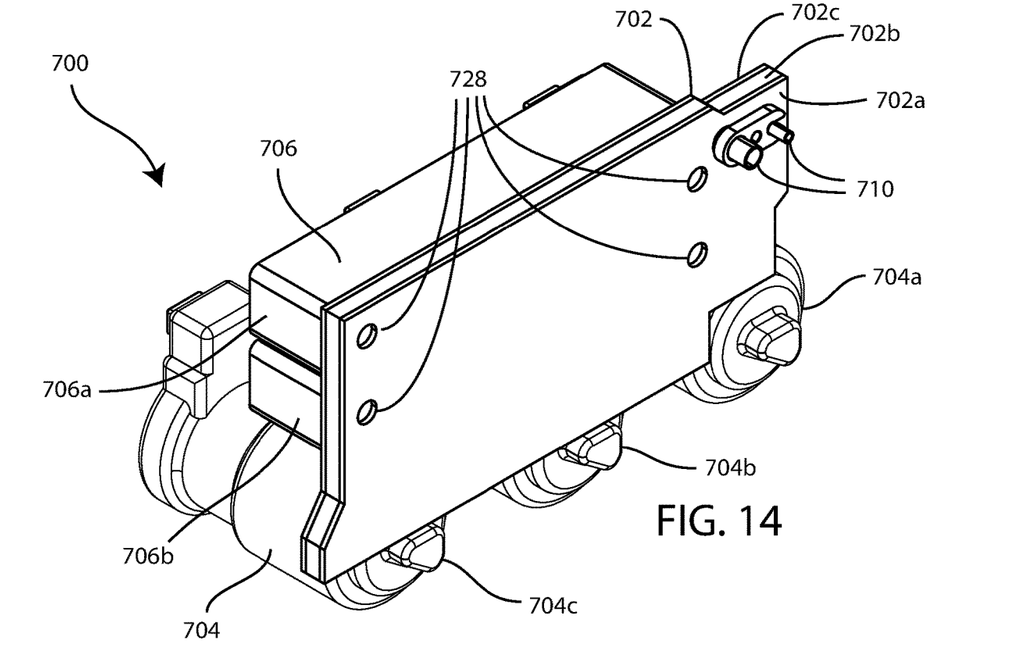
FIG. 14 with the fifth manifold of FIGS. 12 and 13 with a plurality of coolant connectors according further principles disclosed herein as viewed from a coolant container side of the manifold.
Figure 15:
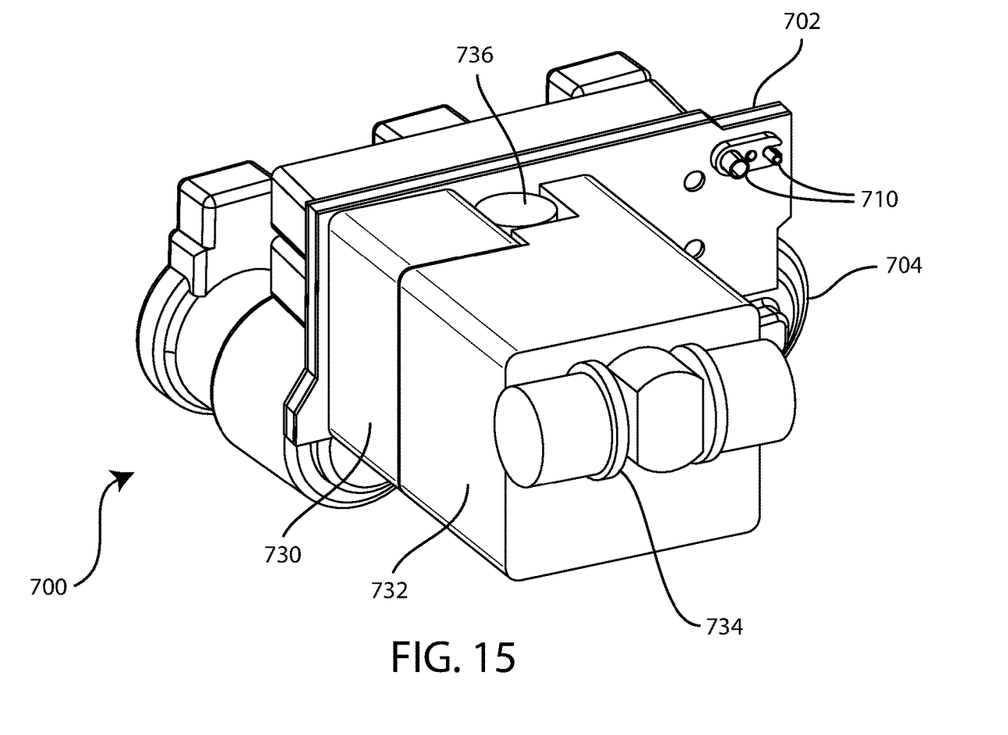
FIG. 15 illustrates the fifth manifold of FIGS. 12-14 with interconnected compressors, heat exchangers, liquid-cooled condenser, receiver-drier, coolant container, and fluid handling assembly according to further principles disclosed herein as viewed from the coolant container side of the manifold.

Unlike FIGS. 1-10, the manifold 602 is T-shaped, thereby covering the liquid-cooled condenser 606. FIGS. 12-15 illustrate an embodiment of another assembly with a fifth manifold coupled to a plurality of compressors and a plurality of heat exchangers according to further principles disclosed herein. FIG. 12 illustrates an assembly 700 as viewed from a compressor side of a fifth manifold 702. FIG. 13 illustrates the fifth manifold 702 and a fluid routing scheme. FIG. 14 illustrates the fifth manifold 702 with a plurality of coolant connectors according further principles disclosed herein as viewed from a coolant container side of the manifold. FIG. 15 illustrates the fifth manifold 702 with interconnected compressors, heat exchangers, liquid-cooled condenser, receiver-drier, coolant container, and fluid handling assembly according to further principles disclosed herein as viewed from the coolant container side of the manifold. In particular, the assembly 700 includes the manifold 702, a plurality of compressors 704, a plurality of heat exchangers 706, a plurality of EXVs 708, a plurality of ports 710, a plurality of connectors 728, a liquid-cooled condenser 730, a coolant container 732, a receiver-drier 736, and a plurality of fluid handlers 734.

The manifold 702 may be similar to the manifold 202 and is defined via a plurality of plates 702a-c stacked on each other, which may involve contact with each other and may include physical coupling, such as such as via brazing, adhering, fastening, mating, interlocking, mounting, molding, securing, or other ways, for fluid communication therebetween. The plates 702a-c can be structured, shaped, or sized identical to or different from each other in any way, including material from which the plates 702a-c are manufactured from or contain. For example, the plates 702a-c can include a same material or different materials from each other, in any permutational way.

The compressors 704 may be similar to the compressor 204 and are defined via compressors 704a-c. Note that the compressors 704a-c can include at least two compressors 704, including greater four or greater. The compressors 704a-c are physically and fluidly coupled to the manifold 702, similar to the compressor 202 being physically and fluidly coupled to the manifold 202. Further, note that the compressors 706a-c can be identical to or different from each other in size, shape, type, or others. Although the compressors 706a-c are physically coupled to the manifold 702 on a same side thereof, such as via facing or being exposed thereto, this configuration can differ, such as via at least one of the compressors 706a-c being on a different side thereof.

The heat exchangers 706 are defined via the heat exchangers 706a-b and are physically and fluidly coupled to the manifold 702, whether directly or indirectly. For example, the heat exchangers 706a-b can be physically coupled to the manifold 702 via brazing, adhering, fastening, mating, interlocking, mounting, molding, securing, or other ways such that the heat exchangers 706 a-b can fluidly communicate through the manifold 702, whether inbound or outbound. For example, the compressors 704a-c can be gravitationally below the heat exchangers 706a-b. Note that the heat exchangers 706 a-b can be of any shape, size, or type suitable for physical and fluid coupling to the manifold 702. Although the heat exchangers 706 a-b are cuboid-shaped, the heat exchangers 706a-b can be shaped differently, such as tubularly or others. Further, note that the heat exchangers 706a-b can be identical to or different from each other in size, shape, type, or others. Although the heat exchangers 706a-b are physically coupled to the manifold 702 on a same side thereof, such as via facing or being exposed thereto, this configuration can differ, such as via at least one of the heat exchangers 706a-b being on a different side thereof. Although the compressors 704a-c and the heat exchangers 706a-b are physically coupled to the manifold 702 on a same side thereof, such as via facing or being exposed thereto, this configuration can differ, such as via at least one of the compressors 704a-c or at least one of the heat exchangers 706a-b being on a different side thereof.

The EXVs 708 are defined via the EXVs 708a-b and are physically and fluidly coupled to the manifold 702, whether directly or indirectly. For example, the EXVs 708a-b can be physically coupled to the manifold 702 via brazing, adhering, fastening, mating, interlocking, mounting, molding, securing, or other ways such that the EXVs 708a-b can fluidly communicate through the manifold 702, whether inbound or outbound. Note that the EXVs 708a-b can be of any shape, size, or type suitable for physical and fluid coupling to the manifold 702. Further, note that the EXVs 708a-b can be identical to or different from each other in size, shape, type, or others. Although the EXVs 708a-b are physically coupled to the manifold 702 on a same side thereof, such as via facing or being exposed thereto, this configuration can differ, such as via at least one of the EXVs 708a-b being on a different side thereof. Although the compressors 704a-c and the heat exchangers 706a-b and the EXVs 708a-b are physically coupled to the manifold 702 on a same side thereof, such as via facing or being exposed thereto, this configuration can differ, such as via at least one of the compressors 704a-c or at least one of the heat exchangers 706a-b or at least one of the and the EXVs 708a-b being on a different side thereof.

The ports 710 extend from the manifold 702 and thereby define a refrigerant dual slim-line connection. For example, the ports 710 can be unitary to the manifold 702 or assembled therewith. For example, the ports 710 can be physically coupled to the manifold 702 via brazing, adhering, fastening, mating, interlocking, mounting, molding, securing, or other ways such that the ports 710 can fluidly communicate therewith. The ports 710 are refrigerant charge ports, which may be structured for refrigerant fluid conduction, whether a liquid or a gas. For example, the ports 710 may be threaded and capped when not in use. Note that the ports 710 can be of any shape, size, or type suitable for physical and fluid coupling to the manifold 702.

The connectors 728 are compliant with a Verband der Automobilindustrie (VDA) standard. The connectors 728 are used for a plurality of fluid connections, whether a liquid or a gas, such as a coolant connection. For example, the connectors 728 can be unitary to the manifold 702 or assembled therewith. For example, the connectors 728 can be physically coupled to the manifold 702 via brazing, adhering, fastening, mating, interlocking, mounting, molding, securing, or other ways such that the connectors 728 can fluidly communicate therewith.

As shown in FIG. 13, the assembly 700 includes a channel 738, a channel 722, and a channel 724, which are used for fluid distribution, whether a liquid or a gas, such as a refrigerant. The channel 738 includes a plurality of fluid points 712a-c that fluidly correspond to the compressors 704a-c. Further, the assembly 700 includes a plurality of fluid points 714a, 716a, 718a, 720a that correspond to the heat exchanger 706a. Similarly, the assembly 700 includes a plurality of fluid points 714b, 716b, 718b, 720b that correspond to the heat exchanger 706b. Additionally, the assembly 700 includes a plurality of fluid points 726 that correspond to the EXVs 708a-b and are used to communicate a fluid, whether a liquid or a gas, such as a refrigerant, whether inbound or outbound, to or from the EXVs 708a-b.

As shown in FIG. 15, the liquid-cooled condenser 730 is similar to the liquid-cooled condenser 206. The coolant container 732 is similar to the coolant container 208. The fluid handlers 734 are similar to the fluid handlers 212. The receiver-drier 736 is similar to the receiver-drier 210. As such, the assembly 700 may form a heat pump.

In some embodiments, a manifold, as disclosed herein, is used in a liquid-cooled refrigeration system with an integrated coolant system, where (1) an air-cooled condenser used in current vehicles would be replaced with a refrigerant to coolant heat exchanger and (2) heat from a refrigeration system would be rejected with a larger radiator.

In some embodiments, a manifold, as disclosed herein, is used in a heat pump, liquid-cooled refrigeration system with an integrated coolant system, where any additional components required for the heat pump system would be integrated into the manifold, which eliminates the need for a positive temperature coefficient (PTC) heater.

In some embodiments, a manifold, as disclosed herein, can host an oil separator to separate an oil of a compressor from a refrigerant and then return the oil back to the compressor. The oil separator can be externally coupled to the manifold, as disclosed herein, such as via fastening, mating, brazing, or others. The oil separator can also be hosted internal to the manifold, as disclosed herein.

In some embodiments, a manifold, as disclosed herein, can internally host a heat exchanger to transfer heat between (1) a first refrigerant and a second refrigerant, (2) a refrigerant and a coolant, (3) a refrigerant and a fluid, such as a liquid or a gas, such as air, or (4) a coolant and a fluid, such as a liquid or a gas, such as air.

In some embodiments, since the receiver/drier 210 can include a desiccant and a filter. As such, a manifold, as disclosed herein, can host, whether internally or externally, at least one of the desiccant or the filter. For example, at least one of the filter or the desiccant can be included in a separate component coupled to the manifold, as disclosed herein, such as via fastening, mating, brazing, or others, or be installed internally in a cavity within the manifold.

In some embodiments, a manifold, as disclosed herein, is used in an air-cooled refrigeration system, where (1) the manifold would be integrated with a compressor, a chiller, and other small components, (2) heat from a refrigeration system would be rejected through an air-cooled condenser (as in current vehicles), and (3) additional air conditioning hoses are employed to connect the manifold to an air-cooled condenser.

It can be appreciated that although overall plate-shaped and T-shaped manifolds have been discussed herein, depending on the assembly of components, and where the components are to be attached to a manifold, a manifold can be shaped differently, such as, as viewed in cross-section, U-shaped, L-shaped, V-shaped, M-shaped, H-shaped, Y-shaped, or D-shaped, to identify a few.

Resultantly, the various technologies, as disclosed herein, have various advantages, such as at least one of (1) reducing a number of components, (2) eliminating most air conditioning lines which are difficult to assemble with automated equipment, (3) reducing mass of components or refrigerant, which is expensive, (4) reducing wasted package space, (5) improving reliability by reducing a number of seals, (5) improving an ability to automate an assembly of a thermal system, (6) enabling a refrigerant fill and system testing on a subassembly line, with integrated evaporator, (7) lots of design flexibility with stamped plates, (8) an ability to integrate an internal heat exchange between refrigerant channels, (9) potentially eliminating a routine refrigerant service by significantly reducing a number of rubber seals and hose which cause refrigerant loss and water ingress, or (10) consolidating service access locations for a refrigerant system (charge ports, desiccant access) and coolant system (fill cap).

Note that features described with respect to certain embodiments can be combined and sub-combined in and/or with various other embodiments. Also, different aspects and/or elements of embodiments, as disclosed herein, can be combined and sub-combined in a similar manner as well. Further, some embodiments, whether individually and/or collectively, can be components of a larger system, wherein other procedures can take precedence over and/or otherwise modify their application. Additionally, a number of steps can be required before, after, and/or concurrently with embodiments, as disclosed herein. Note that any and/or all methods and/or processes, at least as disclosed herein, can be at least partially performed via at least one entity in any manner.

Embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A device comprising:
a discrete plate-shaped manifold that has first and second spaced-apart, parallel, and oppositely-facing major planar outer surfaces and one or more fluid channels in between the first and second major planar outer surfaces which major planar outer surfaces enclose the one or more fluid channels;
at least one compressor in fluid communication with the manifold and attached to and hosted on the first major planar outer surface; and
a fluid source in fluid communication with the manifold and attached to and hosted on the second major planar outer surface,
wherein,
the manifold extends between the at least one compressor and the fluid source, and
the fluid source includes at least one of a condenser, a chiller, a receiver-drier, or a coolant container, and
wherein the manifold comprises two or more plates stacked and secured together, a first plate having the first major planar outer surface and a first interior surface, a second plate having a second interior surface, the first and second plates positioned with the first and second interior surfaces facing each other, the first interior surface, the second interior surface, or both having the one or more of the fluid channels formed therein as concavities therein.

2. The device of claim 1, wherein the second major planar outer surface also hosts at least one of a motor or a sensor.

3. The device of claim 1, wherein the manifold is T-shaped in cross section.

4. The manifold of claim 1, wherein the plates are fused together.

5. The device of claim 1, wherein the at least one compressor includes a plurality of compressors.

6. The device of claim 5, further comprising:
a heat exchanger coupled to the manifold such that the heat exchanger faces the first major planar outer surface.

7. The device of claim 5, further comprising:
a valve coupled to the manifold such that the valve faces the the second major planar outer surface.

8. The device of claim 5, further comprising:
a VDA connector coupled to the manifold such that the manifold extends between the VDA connector and the plurality of compressors.

9. The device of claim 1, wherein the coolant container is in direct connection with the condenser and/or the chiller.

10. The device of claim 1, wherein the receiver-drier is integrated with the condenser or the chiller.

11. The device of claim 1, wherein the condenser is a liquid-cooled condenser and coolant in the coolant container is a liquid.

12. The device of claim 1, wherein the fluid channels are non-arcuate shaped.

13. The device of claim 1, wherein the one or more fluid channels are located in a plane between the first and second major planar outer surfaces, which major planar outer surfaces enclose the one or more fluid channels.

14. An HVAC assembly comprising:
a discrete plate-shaped manifold that has first and second spaced-apart, parallel, and oppositely-facing major planar outer surfaces and one or more fluid channels in between the first and second major planar outer surfaces which major planar outer surfaces enclose the one or more fluid channels;
a fluid source which is fluidly coupled to the manifold and which is attached to and hosted on the manifold; and
at least one compressor which is in fluid communication with the manifold and which is attached to and hosted on the manifold, the at least one compressor being located on the first major planar outer surface and the fluid source being located on the second major planar outer surface, wherein the manifold comprises two or more plates stacked and secured together, a first plate having the first major planar outer surface and a first interior surface, a second plate having a second interior surface, the first and second plates positioned with the first and second interior surfaces facing each other, the first interior surface, the second interior surface, or both having the one or more of the fluid channels formed therein as concavities therein.

15. The HVAC assembly of claim 14, wherein the fluid source includes at least one of a liquid-cooled condenser, a chiller, a receiver-drier, or a coolant container.

16. The HVAC assembly of claim 14, wherein the second major planar outer surface hosts at least one of a motor or a sensor.

17. The HVAC assembly of claim 14, wherein the manifold is T-shaped in cross section.

18. The HVAC assembly of claim 14, wherein the at least one compressor includes a plurality of compressors.

19. The HVAC assembly of claim 18, wherein the fluid source includes a heat exchanger coupled to the manifold such that the heat exchanger faces the first major planar outer surface.

20. The HVAC assembly of claim 18, further comprising: a valve coupled to the manifold such that the valve faces the second major planar outer surface.

21. The HVAC assembly of claim 18, further comprising: a VDA connector coupled to the manifold such that the manifold extends between the VDA connector and the plurality of compressors.

22. A motorized vehicle comprising:
an HVAC assembly including a fluid source;
a discrete plate-shaped manifold that has first and second spaced-apart, parallel, and oppositely-facing major planar outer surfaces and one or more fluid channels in between the first and second major planar outer surfaces which major planar outer surfaces enclose the one or more fluid channels to which the fluid source is coupled and on which the fluid source is hosted; and
at least one compressor which is fluidly coupled to the manifold and which is attached to and hosted on the first major planar outer surface, the fluid source being attached to and hosted on the second major planar outer surface, wherein the manifold comprises two or more plates stacked and secured together, a first plate having the first major planar outer surface and a first interior surface, a second plate having a second interior surface, the first and second plates positioned with the first and second interior surfaces facing each other, the first interior surface, the second interior surface, or both having the one or more of the fluid channels formed therein as concavities therein.

23. The vehicle of claim 22, wherein the fluid source includes at least one of a liquid-cooled condenser, a chiller, a receiver-drier, or a coolant container.

24. The vehicle of claim 22, wherein the first major planar outer surface or the second major planar outer surface hosts at least one of a motor or a sensor.

25. The vehicle of claim 22, wherein the manifold is T-shaped in cross section.

26. The vehicle of claim 22,
wherein the at least one compressor includes a plurality of compressors.

27. The vehicle of claim 26, wherein the fluid source includes a heat exchanger coupled to the manifold such that the heat exchanger faces the first major planar outer surface.

28. The vehicle of claim 26, further comprising:
a valve coupled to the manifold such that the valve faces the second major planar outer surface.

29. The vehicle of claim 26, further comprising:
a VDA connector coupled to the manifold such that the manifold extends between the VDA connector and the plurality of compressors.

30. The motorized vehicle of claim 22, further comprising: an electric motor powering a vehicle wheel.

* * * * *